United States Patent
Lee et al.

(10) Patent No.: US 11,178,388 B2
(45) Date of Patent: Nov. 16, 2021

(54) 3D DISPLAY SYSTEM FOR CAMERA MONITORING SYSTEM

(71) Applicant: GENTEX CORPORATION, Zeeland, MI (US)

(72) Inventors: Ethan J. Lee, Byron Center, MI (US); David M. Falb, Grand Rapids, MI (US); Bradley A. Bosma, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/064,751

(22) Filed: Oct. 7, 2020

(65) Prior Publication Data
US 2021/0105454 A1    Apr. 8, 2021

Related U.S. Application Data

(60) Provisional application No. 62/911,585, filed on Oct. 7, 2019.

(51) Int. Cl.
*H04N 13/302*     (2018.01)
*H04N 13/239*     (2018.01)
(Continued)

(52) U.S. Cl.
CPC ............ *H04N 13/302* (2018.05); *B60R 1/04* (2013.01); *B60R 1/12* (2013.01); *B60R 11/04* (2013.01);
(Continued)

(58) Field of Classification Search
CPC .. H04N 13/302; H04N 13/172; H04N 13/156; H04N 5/23238; H04N 5/247;
(Continued)

(56) References Cited

U.S. PATENT DOCUMENTS

| | | | |
|---|---|---|---|
| 2004/0150589 A1* | 8/2004 | Mizusawa | H04N 7/18 345/70 |
| 2008/0007618 A1* | 1/2008 | Yuasa | B60R 1/00 348/118 |
| 2014/0347450 A1* | 11/2014 | Han | G06T 3/0031 348/48 |

FOREIGN PATENT DOCUMENTS

| | | | |
|---|---|---|---|
| DE | 19741896 A1 | | 4/1999 |
| EP | 2505962 A1 | | 10/2012 |
| EP | 2505962 A1 | * | 10/2012 ......... G01C 21/3658 |

OTHER PUBLICATIONS

International Search Report dated Jan. 14, 2021, for corresponding PCT application No. PCT/US2020/054481, 3 pages.
(Continued)

*Primary Examiner* — James M Pontius
*Assistant Examiner* — Tyler B Edwards
(74) *Attorney, Agent, or Firm* — Price Heneveld LLP; Brian James Brewer

(57) ABSTRACT

A system in a vehicle for generating and displaying three-dimensional images may comprise a first imager having a first field of view; a second imager having a second field of view at least partially overlapping the first field of view, the second imager disposed a distance from first imager; and an image signal processor in communication with the first and second imagers; wherein the image signal processor is configured to generate an image having a three-dimensional appearance from the data from the first and second imagers. The first and second imagers may be disposed on a vehicle. The first and second imagers may be configured to capture a scene; and the scene may be exterior to the vehicle.

14 Claims, 3 Drawing Sheets

(51) Int. Cl.
    *H04N 13/156*     (2018.01)
    *H04N 13/172*     (2018.01)
    *H04N 5/247*     (2006.01)
    *H04N 5/232*     (2006.01)
    *H04N 7/18*     (2006.01)
    *B60R 1/12*     (2006.01)
    *B60R 11/04*     (2006.01)
    *B60R 1/04*     (2006.01)
    *G01C 21/36*     (2006.01)
    *H04N 13/271*     (2018.01)

(52) U.S. Cl.
    CPC ....... *G01C 21/367* (2013.01); *H04N 5/23238* (2013.01); *H04N 5/247* (2013.01); *H04N 7/18* (2013.01); *H04N 13/156* (2018.05); *H04N 13/172* (2018.05); *H04N 13/239* (2018.05); *H04N 13/271* (2018.05); *B60R 2001/1215* (2013.01); *B60R 2300/105* (2013.01); *B60R 2300/20* (2013.01); *B60R 2300/303* (2013.01)

(58) Field of Classification Search
    CPC ...... H04N 7/18; H04N 13/271; H04N 13/239; G01C 21/367; B60R 1/12; B60R 11/04; B60R 1/04; B60R 2300/20; B60R 2001/1215; B60R 2300/105; B60R 2300/303
    See application file for complete search history.

(56) References Cited

OTHER PUBLICATIONS

Written Opinion dated Jan. 14, 2021, for corresponding PCT application No. PCT/US2020/054481, 5 pages.

* cited by examiner

3D DISPLAY SYSTEM FOR CAMERA MONITORING SYSTEM

CROSS REFERENCE TO RELATED APPLICATIONS

This application claims the benefit of and priority to U.S. Provisional Patent Application No. 62/911,585, filed on Oct. 7, 2019, entitled "3D Display System For Camera Monitoring System," the entire disclosure of which is hereby incorporated herein by reference.

FIELD OF THE DISCLOSURE

This disclosure relates generally to three dimensional displays, and in particular, to three dimensional displays to be shown on full display vehicle mirror assemblies.

BACKGROUND

Full display mirror assemblies in vehicles may provide drivers with an unobstructed view of scenes to the rear of the vehicle. The full display mirror assemblies may receive images from a camera or other imager configured to capture views to the rear of the vehicle. However, the images may not have the apparent depth that appears in reflections.

SUMMARY

According to an aspect, a system for generating and displaying three-dimensional images may comprise a first imager having a first field of view; a second imager having a second field of view at least partially overlapping the first field of view, the second imager disposed a distance from first imager; and an image signal processor in communication with the first and second imagers. The image signal processor may be configured to generate an image having a three-dimensional appearance from the data from the first and second imagers. The first and second imagers may be disposed on a vehicle.

The first and second imagers may be configured to capture a scene; and the scene may be exterior to the vehicle. The scene may be to the rear of the vehicle. The first and second imagers may be configured to capture images of a scene to the front of the vehicle. The system may further comprise a first display element. The first display element may be in communication with the image signal processor and may be configured to display images based on data received from the image signal processor. The images may appear to be three dimensional. The first display element may be one of a rearview assembly and a console display element of a vehicle. The image signal processor may be configured to selectively cause icons to appear within the displayed image. The first and second imagers may be configured to capture images of a scene to the front of the vehicle. The image signal processor may be in communication with a navigation program and may be configured to cause the display of three-dimensional turn-by-turn navigation assistance on a display element.

The system may further comprise a third imager having a third field of view, the third imager configured to capture an image of a scene, and a fourth imager having a fourth field of view partially overlapping the third field of view, the fourth imager configured to capture an image of a scene and disposed a distance from the third imager. The third and fourth imagers may be in communication with the image signal processor. The third and fourth imagers may be disposed on or in the vehicle. The third and fourth imagers may be configured to capture images of a scene exterior to the vehicle. The third and fourth imagers may be configured to capture images of a scene to a side of the vehicle. The second and third fields of view partially overlap. The image signal processor may be configured to combine data from first, second, third, and fourth images into a wide-angle image. Data from one of the first and second imagers may be used to generate a depth map of the scene. Data from one of third and fourth imagers may be used to generate a depth map of the scene.

The system may further comprise a second display element. The second display element may be in communication with the image signal processor and may be configured to display images based on data received from the image signal processor. The data may be from images captured by the third and fourth imagers. The displayed images appear to be three dimensional. The second display element may be a side display element of a vehicle.

According to another aspect, a method of generating three-dimensional images may comprise capturing, with a first imager having a first field of view, an image of a scene exterior to a vehicle; capturing, with a second imager having a second field of view partially overlapping the first field of view, an image of a scene exterior to a vehicle, the second imager disposed a distance from first imager; transmitting data captured from the scene from the first and second imagers to an image signal processor. The first and second imagers and the image signal processor may be disposed in a vehicle. The method may further comprise processing, by the image signal processor, the data from the scene to generate a data set configured to produce a three-dimensional image. The method may further comprise transmitting the data configured to produce a three-dimensional image to a first display element and displaying the three-dimensional image on the first display element. The first display element may be one of a rearview assembly and a vehicle console display element. The method may further comprise causing, by the image signal processor, icons to appear within the displayed image. The method may further comprise generating, by the image signal processor, a depth map of the scene by using data from second imager. The method may further comprise combining, by the image signal processor, data from the first imager with the depth map of the scene to generate a three-dimensional image.

The method may further comprise capturing, with a third imager having a third field of view, an image of a scene exterior to a vehicle; capturing, with a fourth imager having a fourth field of view partially overlapping the third field of view, an image of a scene exterior to a vehicle, the fourth imager disposed a distance from third imager; and transmitting data captured from the scene by the third and fourth imagers to the image signal processor. The third and fourth imagers may be disposed in the vehicle and the scene to be captured may be exterior to the vehicle. The method may further comprise processing, by the image signal processor, the data captured from the scene by the third and fourth imagers. The method may further comprise transmitting to a second display element the processed data captured from the scene by the third and fourth imagers; wherein the processed data may be capable of causing the second display element to display a three-dimensional image. The data from the fourth imager may be used to generate a depth map of the scene. The image signal processor may be configured to generate a three-dimensional image using the depth map of the scene and the captured images from the third imager.

DETAILED DESCRIPTION

Figure 1:
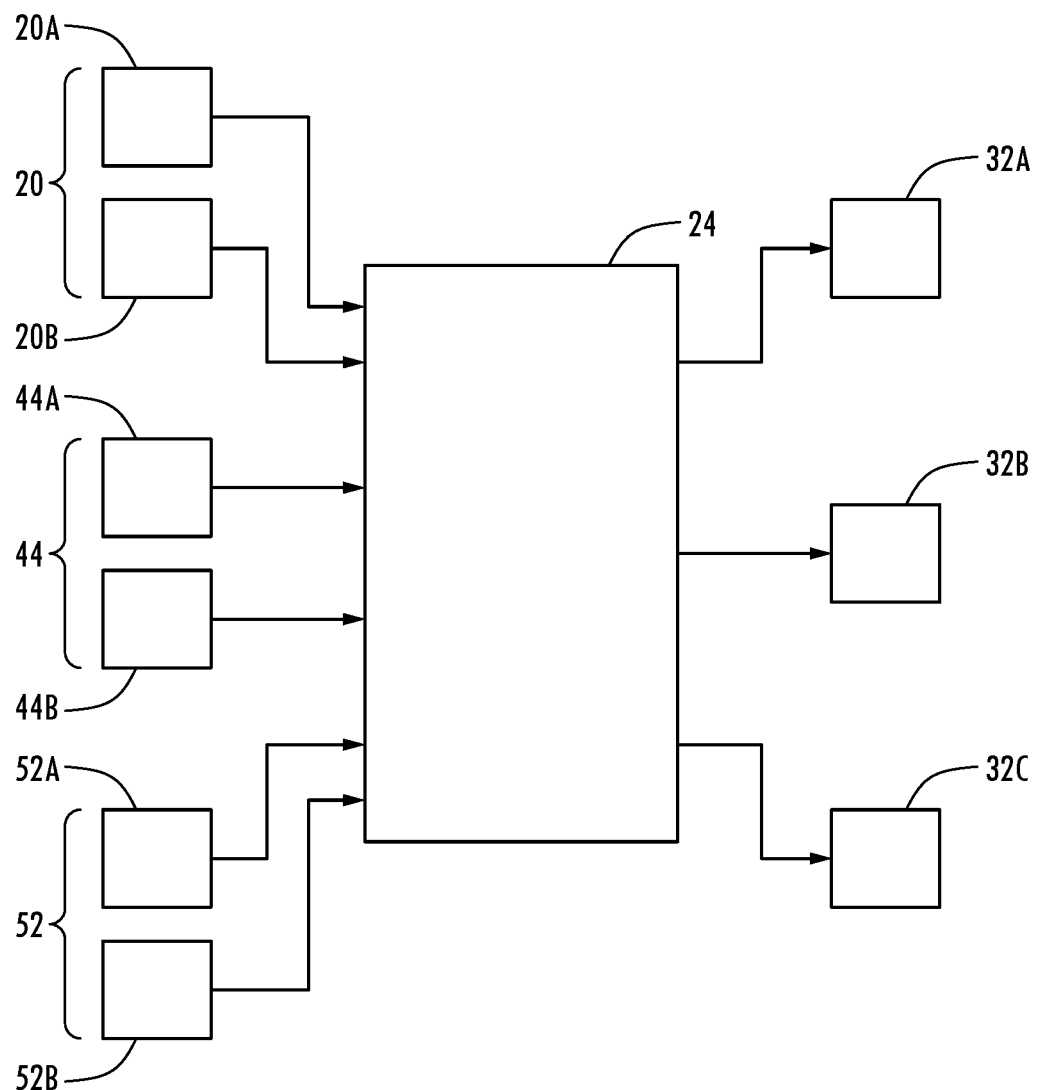
FIG. 1 illustrates a schematic diagram of a 3-dimensional system for a three-dimensional camera monitoring and display system.
Figure 2:
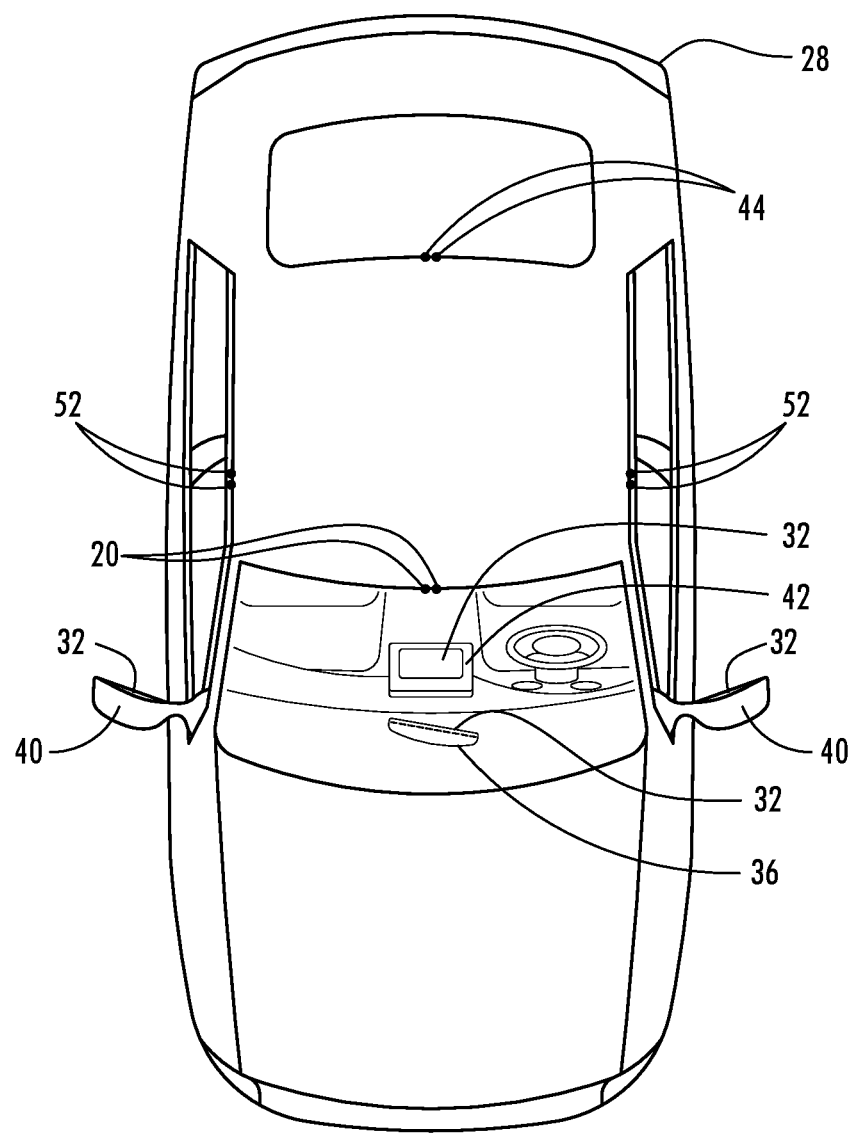
FIG. 2 illustrates a diagram of an embodiment of the three-dimensional camera monitoring and display system of FIG. 1, showing some of the possible camera or imager positions.

Referring to FIG. 1, a three-dimensional camera monitoring and display system is shown generally at 10. Three-dimensional camera monitoring and display system 10 may comprise at least a first imager pair 20 comprising a first camera or imager 20A and a second camera or imager 20B, and an image signal processor 24 in communication with first and second imagers 20A, 20B. As shown in FIG. 2, three-dimensional camera monitoring and display system 10 may be disposed in a vehicle 28.

First imager 20A may have a first field of view. First imager 20A may comprise a wide-angle lens and may have a wide-angle field of view. First imager 20A may be disposed to be capable of capturing an image of a scene. The scene may be exterior to vehicle 28. In some embodiments, the scene may be to the front of vehicle 28. In some embodiments, the scene may be to the rear of vehicle 28. In some embodiments, the scene may be to a side of vehicle 28. First imager 20A may be configured to transmit data from the captured images to image signal processor 24. The images captured by first imager 20A may be video images.

Second imager 20B may be disposed in proximity to and in a spaced-apart relationship with first imager 20A. Second imager 20B may have a second field of view. Second imager 20B may comprise a wide-angle lens and may have a wide-angle field of view. Second field of view may at least partially overlap first field of view. Second imager 20B may be disposed to be capable of capturing an image of a scene, and the scene may be exterior to vehicle 28. The scene captured by second imager 20B may at least partially coincide with the scene captured by first imager 20A. Second imager 20B may be configured to transmit data from the captured images to image signal processor 24. The images captured by second imager 20B may be video images. First and second imagers 20A, 20B may be disposed in an interior of vehicle or on an exterior of vehicle 28.

In some embodiments, image signal processor 24 may be configured to use the data from the images captured by both first and second imagers 20A, 20B to generate three-dimensional images and/or video. In some embodiments, second imager 20B may be capable of generating a depth map of the scene, wherein the depth map may contain information about the distance between the surface of an object from a given viewpoint. The depth map may be in grayscale. Image signal processor 24 may be configured to generate three-dimensional images and/or video using the data from first imager 20A combined with the depth map generated by second imager 20B.

Three-dimensional camera monitoring and display system 10 may further comprise at least one display element 32. Each of the at least one display elements 32 may be in communication with image signal processor 24. In some embodiments, display element 32 may be disposed on a rearview assembly 36 of vehicle 28. In some embodiments, display element 32 may be disposed on one of the side-view mirror assemblies 40 of vehicle 28. In some embodiments, display element 32 may be disposed on an interior surface of vehicle, such as an interior door panel or an interior surface of a vehicle pillar (not shown). In some embodiments, display element 32 may comprise a display screen 42 on an infotainment console of vehicle 28. In some embodiments, three-dimensional camera monitoring and display system 10 may comprise more than one display element 32. For example, three-dimensional camera monitoring and display system 10 may comprise both the rearview assembly 36 and the side-view mirror assemblies 40 of vehicle 28, or the rearview assembly 36, the side-view mirror assemblies 40, and the display screen 42 on the infotainment console of vehicle 28.

Each of the at least one display elements 32 may be configured to display images based on data received from the image signal processor 24. Image signal processor 24 may be configured to transmit data to at least one display element 32 for display. The displayed images on each of the at least one display element 32 may be generated from images captured by an imager pair. At least one display element 32 may be capable of displaying three-dimensional images. Thus, three-dimensional camera monitoring and display system 10 may be configured to produce and display three-dimensional images on at least one display element 32.

In some embodiments, three-dimensional camera monitoring and display system 10 may further comprise at least a second imager pair 44 comprising a third camera or imager 44A and a fourth camera or imager 44B. Fourth imager 44B may be disposed in proximity to and in a spaced-apart relationship with third imager 44A. Third imager 44A may have a third field of view, and fourth imager 44B may have a fourth field of view that at least partially overlaps third field of view. Third and fourth imagers 44A, 44B may be in communication with image signal processor 24.

Third and fourth imagers 44A, 44B may be disposed to be capable of capturing images of a scene. The scene may be exterior to vehicle 28. The scene may be to the front of vehicle 28, or to the rear of vehicle 28 to a side of vehicle 28, and may be at an angle from vehicle 28. Third and fourth imagers 44A, 44B may be disposed in an interior or on an exterior of vehicle 28. Third and fourth imagers 44A, 44B may be configured to transmit data from the captured images to image signal processor 24. The images captured by third and fourth imagers 44A, 44B may be video images.

In some embodiments, third and fourth fields of view may partially overlap first and second fields of view. This may allow image signal processor 24 to combine images captured by first and second imagers 20A, 20B with images captured by third and fourth imagers 44A, 44B to create a larger image.

In some embodiments, fourth imager 44B may be capable of generating a depth map of the scene. Image signal processor 24 may be configured to generate three-dimensional images and/or video using the data from third imager 44A combined with the depth map generated by fourth imager 44B.

In some embodiments, image signal processor 24 may be configured to transmit data from images captured by first and second imagers 20A, 20B to be displayed on first display element 32A and data from images from the third and fourth imagers 44A, 44B to be displayed on second display element 32B.

In some embodiments, at least one additional imager pair may be configured to capture images of a scene to the exterior of vehicle 28, and image signal processor 24 may be configured to transmit data from the at least one additional imager pair to be displayed on an additional display element 32. Image signal processor 24 may be configured to process data from each of the at least one additional imager pairs and transmit it to additional display element 32. For example, a third imager pair 52 may comprise a fifth and a sixth imager 52A, 52B, and may be configured to capture images of a scene exterior to vehicle 28 for display on a third display element 32C. Fifth and sixth imagers 52A, 52B, may be disposed in an interior or on an exterior of vehicle 28.

In some embodiments, image signal processor 24 may be configured to generate icons or other graphic images and cause the icons or other graphic images to appear on one of the display elements 32. The icons or other graphic images may appear to be three-dimensional.

In some embodiments, three-dimensional camera monitoring and display system 10 may be in communication with a global positioning system and/or a map or navigation program. Image signal processor 24 may be configured to cause icons or other graphic images, comprising arrows or other directional indicators, to be overlaid on a displayed image. The directional indicators may indicate, for example, turn-by-turn directions to a chosen destination. The graphic images used in the turn-by-turn directions may appear to be three dimensional. For example, a display element 32 may display a three-dimensional image of the view in front of vehicle 28. Instead of navigation arrows that point up to indicate vehicle 28 should continue to go straight, the navigation arrows may appear to go into the image in the direction in which vehicle 28 is travelling.

Figure 3:
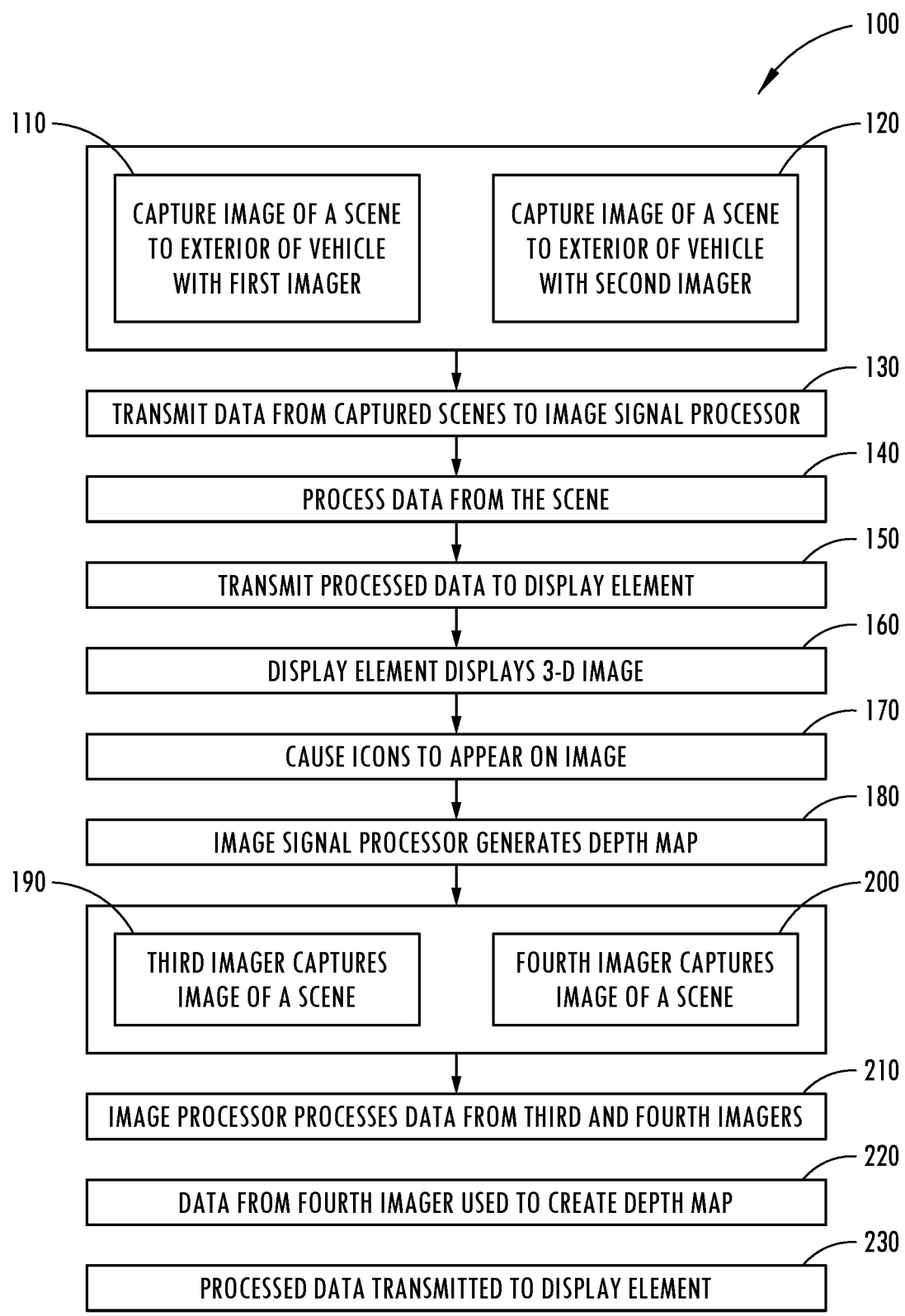
FIG. 3 illustrates a flowchart of a method for generating three-dimensional images for the three-dimensional camera monitoring and display system of FIG. 1.

Referring to FIG. 3, a method of generating three-dimensional images, shown generally at 100, may comprise capturing, with first imager 20A, an image of a scene to the exterior of vehicle 28 as shown in step 110 and capturing, with second imager 20B, an image of the scene to the exterior of vehicle 28 as shown in step 120. The scene captured by first imager 20A may at least partially overlap the scene captured by second imager 20B. The first and second imagers 20A, 20B and the image signal processor 24 may be disposed in vehicle 28 and the scene may be exterior to vehicle 28. At step 130, data from the captured images of the scene may be transmitted to image signal processor 24.

In step 140, the method may further comprise processing, by the image signal processor 24, the data from the scene. The data may be processed to produce a data set that, when transmitted to a display element 32, may produce a three-dimensional image. In step 150, the data set may be transmitted to a display element 32. In step 160, display element 32 may display a three-dimensional image generated from the data set. Display element 32 may comprise one of a rearview assembly 36, vehicle 28 side-view mirror 40, and a display screen 42 on vehicle 28 console.

In some embodiments, as shown in step 170, the image signal processor 24 may cause icons to appear within the displayed image. In step 180, image signal processor 24 may generate a depth map of the scene by using data from one of first and second imagers 20A, 20B. In step 180, image signal processor 24 may combine the depth map with data captured by first imager 20A to generate a data set that will produce a three-dimensional image of the scene.

In step 190, a third imager 44A having a third field of view may capture an image of a scene, and in step 200, a fourth imager 44B having a fourth field at least partially overlapping the third field of view may capture an image of a scene. The scene may be exterior to vehicle 28. In step 210, data from the images captured by third and fourth imagers 44A, 44B may be transmitted to image signal processor 24, and image signal processor 24 may process the data captured by third and fourth imagers 44A, 44B. In step 220, data from fourth imager 44B may be used to generate a depth map. In step 230, the processed data may be transmitted to a second display element 32B. The processed data may be capable of causing second display element 32B to display a three-dimensional image. Third and fourth imagers 44A, 44B may be disposed in vehicle 28, and the scene may be exterior to vehicle 28. The depth map may be combined with data from images captured by third imager 44A by image signal processor 24 to generate a three-dimensional image to be displayed on second display element 32B.

The above description is considered that of the preferred embodiments only.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

In this document, relational terms, such as first and second, top and bottom, front and back, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

The invention claimed is:

1. A system for generating and displaying three-dimensional images, comprising:
 a first imager having a first field of view;
 a second imager having a second field of view at least partially overlapping the first field of view, the second imager disposed a distance from first imager; and
 an image signal processor in communication with the first and second imagers;
 wherein image data from the second imager is used by the image signal processor to generate a first depth map of the scene;
 wherein the first depth map is in grayscale;
 wherein the image signal processor is configured to process the first depth map combined with image data from the first imager to generate a first data set comprising data, the first data set capable of producing an image having a three-dimensional appearance; and
 wherein the first and second imagers are disposed on a vehicle.

2. The system of claim 1, wherein the first and second imagers are configured to capture images of a scene to one of the rear of the vehicle and the front of the vehicle.

3. The system of claim 1, further comprising a first display element; wherein the first display element is in communication with the image signal processor and configured to display images based on data received from the image signal processor.

4. The system of claim 3, wherein the image signal processor is configured to selectively cause icons to appear within the displayed image.

5. The system of claim 4, wherein the first and second imagers are configured to capture images of a scene to the front of the vehicle; and
 wherein the image signal processor is in communication with a navigation program and is configured to cause the display of three-dimensional turn-by-turn navigation assistance on a display element.

6. The system of claim 1, further comprising a third imager having a third field of view, the third imager configured to capture an image of a scene; and
 a fourth imager having a fourth field of view partially overlapping the third field of view, the fourth imager configured to capture an image of a scene and disposed a distance from the third imager;
 wherein the third and fourth imagers are in communication with the image signal processor;
 wherein image data from the fourth imager is used to generate a second depth map of the scene;
 wherein the second depth map is in grayscale;
 wherein the image signal processor is configured to process the second depth map combined with image data from the third imager to generate a second data set comprising data, the second data set capable of producing an image having a three-dimensional appearance;
 wherein the third and fourth imagers are disposed on or in the vehicle; and
 wherein the third and fourth imagers are configured to capture images of a scene exterior to the vehicle.

7. The system of claim 6, wherein the second and third fields of view partially overlap; and
 wherein the image signal processor is configured to combine image data from first, second, third, and fourth images into a wide-angle image.

8. The system of claim 6, wherein image data from one of the first and second imagers is used to generate a depth map of the scene; and
 wherein image data from one of third and fourth imagers is used to generate a depth map of the scene.

9. The system of claim 8, further comprising a second display element;
 wherein the second display element is in communication with the image signal processor and configured to display images based on data received from the image signal processor;
 wherein the data is from images captured by the third and fourth imagers; and
 wherein the displayed images appear to be three dimensional.

10. A method of generating three-dimensional images, comprising:
 capturing, with a first imager having a first field of view, an image of a scene exterior to a vehicle;
 capturing, with a second imager having a second field of view partially overlapping the first field of view, an image of a scene exterior to a vehicle, the second imager disposed a distance from first imager;
 transmitting image data captured from the scene from the first and second imagers to an image signal processor;
 generating, by the image signal processor, a first depth map in grayscale of the scene using image data from the second imager; and
 processing, by the image signal processor, the image data from the first imager combined with the first depth map to generate a first data set comprising data, the first data set capable of producing an image having a three-dimensional appearance;
 wherein the first and second imagers and the image signal processor are disposed in a vehicle.

11. The method of claim 10, further comprising transmitting the first data set to a first display element and displaying the three-dimensional image on the first display element, wherein the first display element is one of a rearview assembly and a vehicle infotainment console display element.

12. The method of claim 11, further comprising causing, by the image signal processor, icons to appear within the displayed image.

13. The method of claim 10, further comprising:
 capturing, with a third imager having a third field of view, an image of a scene exterior to a vehicle;
 capturing, with a fourth imager having a fourth field of view partially overlapping the third field of view, an image of a scene exterior to a vehicle, the fourth imager disposed a distance from third imager;
 transmitting image data captured from the scene by the third and fourth imagers to the image signal processor;

generating, by the image signal processor, a second depth map of the scene using the image data from the fourth imager; and processing, by the image signal processor, the image data from the third imager combined with the second depth map to generate a second data set capable of producing an image that appears to be three-dimensional;

wherein the second depth map is in grayscale; and wherein the third and fourth imagers are disposed in the vehicle and the scene to be captured is exterior to the vehicle.

14. The method of claim 13, further comprising transmitting to a second display element the processed image data captured from the scene by the third and fourth imagers;

wherein the processed image data is capable of causing the second display element to display a three-dimensional image.

* * * * *